Feb. 19, 1957 F. R. V. STÅLEMARK ET AL 2,782,258
AUTOMATIC CONTROL SYSTEM
Filed Dec. 21, 1951
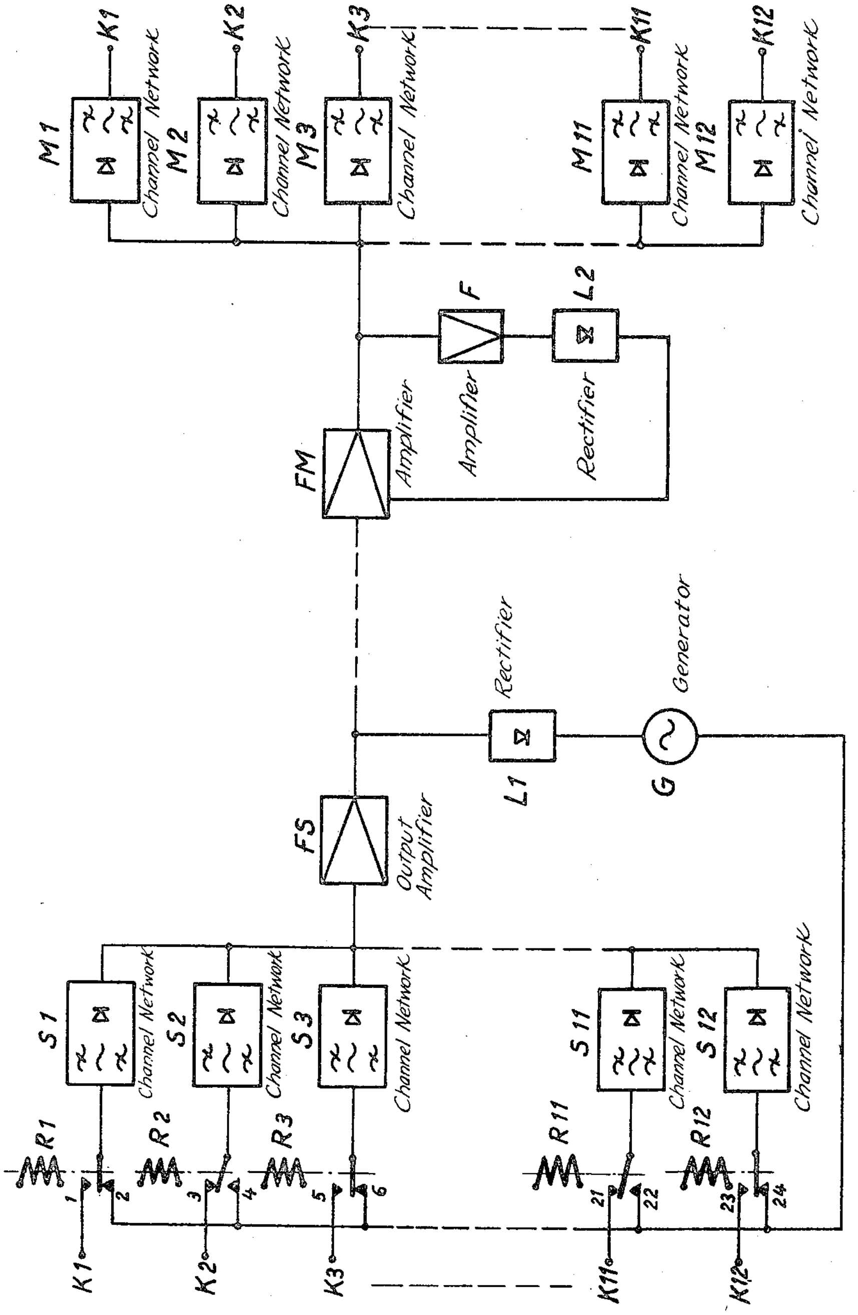
INVENTORS
FRITZ RAGNAR VALDEMAR STÅLEMARK
DAN BJÖRN HJALMAR LUNDVALL
BY Frederick E. Hane
ATTORNEY United States Patent Office 2,782,258

Patented Feb. 19, 1957

2,782,258

AUTOMATIC CONTROL SYSTEM

Fritz Ragnar Valdemar Stålemark, Stora Essingen, Stockholm, and Dan Björn Hjalmar Lundvall, Stockholm, Sweden, assignors to Telefonaktiebolaget L M Ericsson, Stockholm, Sweden, a company of Sweden Application December 21, 1951, Serial No. 262,816

Claims priority, application Sweden December 29, 1950

9 Claims. (Cl. 179—15)

The present invention relates to control means for the automatic control and regulation of the output level of amplifiers used in systems for the transmission of multichannel carrier frequency signals.

In carrier frequency systems or installations for the transmission of signal intelligence it is desirable to keep substantially constant the signal strength in the different amplifier sections forming part of the installation, that is, independent of the variations which appear as a result of the variations in attenuation in the leads or transferring means of other kinds by means of which the signals are transmitted, and also independent of the other factors which influence the signal level within the installation. In other words, it is essential that the variations in the signal level are kept in such systems in as narrow limits as possible. The strength of the signals reaching any repeater within the signal transmitting system depends, beside the attenuation of the transmission medium, also on the volume level of the transmitted speech and on the number of transmission channels which are used in each particular case.

The present invention is concerned with the level differences which depend on these factors. Accordingly, one of the objects of the invention is to keep the output of the different amplifiers of the system as constant as possible. This has the advantage that the different components of the system can be simplified in their design and that the working properties of the system are considerably improved. As a result, the risk of overloading the different amplifiers of a system according to the invention is decreased.

According to a now preferred embodiment of the invention, an automatic control and regulation of the output level of the amplifier means in systems for the transmission of carrier frequencies is attained by providing a generator arranged to produce a signal in form of a noise which may be a pure sound or a frequency mixture whose output is so controlled by the signal current of an output amplifier common for a number of intelligence transmitting channels that the total output of the output amplifier remains practically constant. For this purpose, the output end of the generator is connected to the input side of the channel networks associated with each transmission channel and comprising filter and modulating means when the corresponding channels are not busy with the transmission of intelligence as speech.

In other words, the generator is connected to each transmitting channel which is not busy at a given moment and supplies to the networks of the respective channels a pure sound or other noise which is transmitted over the transmission lines within the particular carrier frequency channel and which with respect to the total level in this channel is equivalent to the level of speech taking place at that time. It will now be evident that variations in the level due to a varying number of busy channels do not occur in a system designed in this manner by reason of the fact that with respect to the influence of the channels on the signal level within the system all the channels can be considered as being busy at each given moment.

The figure shows a system for the transmission of carrier frequencies comprising twelve transmission channels K1–K12, of which for sake of simplicity only the channels K1, K2, K3 and K11—K12 with the respective networks in the transmitting and receiving stations are illustrated. Each of the channels can be connected through closing contacts 1, 3, 5 . . . 21, 23 to a respective channel network S1—S12 at the transmitting station. Each channel network comprises filter and modulating means in conventional arrangement. These networks are supplied with the particular carrier frequency by oscillators (not shown) and this frequency is modulated by the speech frequency over the contacts. The different channel networks are connected through a common lead to a common end amplifier FS over transmission wires to an input amplifier FM at the receiving station. After separation and demodulation in the channel installations M1—M3, M11—M12, the different transmission channels are again separated from one another, and the speech frequencies are taken off at the output terminals K1—K3, K11—K12 at the right side of the figure.

As will be apparent to any person skilled in this specific art, the above details, and the figure merely represent a simplified explanation of a conventional 12-channel system for the transmission of carrier frequencies. Such a system, in actual practice, naturally comprises various other components a detailed description does not appear to be essential for the understanding of the invention, such as devices for the compensation of level variations due to varying damping of the transmission medium. It is already known to use for a level regulation a feedback branch of the amplifier FS. This branch comprises a network with variable attenuation and part of the current coming from the amplifier FS, is then led back over the said network to the input terminals of this end amplifier FS. As a result, the strength of the signal current applied to amplifier FS can be varied by regulating the attenuation of the network. Consequently, the power gain of the end amplifier can be adjusted in accordance with the level of the output current of the said amplifier. In practice, this adjustment can be carried out by taking off a certain auxiliary current from the transmission medium which current is applied to the network with variable attenuation for the regulation of the attenuation of the latter. When a negative feedback is used for this feedback branch, that is, when the current flowing over this branch to the input end of the amplifier FS reduces the input current of the amplifier, this adjustment takes place for instance in such a way that, in the case of an increase of the output level from the amplifier FS, said auxiliary current decreases the attenuation of the attenuating network so that the current in the negative feedback branch increases. In the case of a decrease of the output level the attenuation of said network increases and the components of the signal current which reduce the input current of the amplifier FS become smaller as a result of which the output level is increased.

An arrangement of this kind is shown in the figure at the receiving end of the transmission system, where part of the current from the input amplifier FM is taken off over the filtering, rectifying and amplifying means F, 12 and applied to the amplifier FM in a feedback branch for regulating the amplification.

For the same purpose it is possible to use in the feedback branch a generator the output current of which is employed to regulate the amplification in the amplifier FS. The strength of this current is regulated in accordance with the output level of the amplifier FS so that an increase in the level of the latter causes a decrease of the current produced by the generator for the regulation of the amplifier and thereby of the power gain, and, conversely, a decrease of the ouput level causes an increase of the amplification of the amplifier.

According to the present invention, part of the output current of the amplifier FS is taken off and applied over suitable filtering and rectifying means $L_1$ to a generator G, whose output is controlled by said current in such a way that it is conversely proportional to the level of the output current. The generator G produces a noise which may be either a pure sound or a mixture of several sounds, and its output current is applied to channels within the carrier frequency system which at the moment are not buty. As will be seen from the figure, this current is applied over the input end of the particular channel networks and over contacts 2, 4, 6 . . . 22, 24 to a relay $R_1$—$R_3$, $R_{11}$—$R_{12}$.

In this connection it should be pointed out that the contacts with even numbers are breaker contacts which, hence, are closed when the corresponding relay is deenergized. The other, previously mentioned contacts with the odd numbers over which the speech frequency is applied to the different channel networks $S_1$—$S_3$, $S_{11}$—$S_{12}$ are closing contacts. These latter contacts will be closed when speech is coupled with the corresponding channel $K_1$—$K_3$, $K_{11}$—$K_{12}$ respectively in which case the corresponding relay becomes energized. In the figure, speech is shown coupled to the channels $K_2$ and $K_{11}$ whereas the channels $K_1$, $K_3$ and $K_{12}$ are unoccupied at the illustrated moment, that is, not engaged for a speech connection. Consequently, the current supplied by the generator G is applied to these unoccupied channels $K_1$, $K_3$ and $K_{12}$ over the corresponding contacts 2, 6 and 24. The generator current passes through the corresponding networks $S_1$, $S_3$ and $S_{12}$ and is fed from the latter to the amplifier FS and is finally transmitted over the transmission line.

The illustrated relays $R_1$—$R_3$, $R_{11}$—$R_{12}$ can also be employed by means of not shown contacts for busy marking of the connecting channels $K_1$—$K_3$, $K_{11}$—$K_{12}$ used for speech.

As will now be evident from the previous description, the transmission wires will always be loaded to the full extent in that either speech or a noise will be transmitted in each frequency band assigned to the different channels. The variations which are typical for the conventional systems due to the fact that the number of unoccupied and occupied channels varies at different times, are avoided in a system according to the invention because all the channels, with respect to the effect on the transmission level, are in effect occupied at each moment. The more even loads over the transmission lines, repeaters and other components forming part of the system attained thereby result in great advantages, both from the standpoint of construction and with respect to the transmission characteristics of the system.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An automatic control system for controlling the transmission level of a multi-channel carrier transmission system comprising a plurality of signal intelligence circuits, filtering and modulating means for each circuit, an output amplifier connected with each of said modulating and filtering means, a signal generator, means connecting said generator with the output amplifier for controlling the level of the signal produced by said generator, individual switch means interconnected with each circuit, the associated modulating and filtering means and the signal generator, and means responsive to signal intelligence energies in each circuit to operate the associated switch means to disconnect the respective circuit from its associated modulating and filtering means and to connect the output of said generator to the modulating and filtering means of the said respective circuit.

2. An automatic control system for controlling the transmission level of a multi-channel carrier transmission system comprising a plurality of signal intelligence circuits, filtering and modulating means for each circuit, an output amplifier connected with each of said modulating and filtering means, a signal generator, means connecting said generator with the output amplifier for changing the level of the signal of said generator inversely of the output of said output amplifier, individual switching means interconnected with each circuit, the associated modulating and filtering means and the signal generator, and means responsive to the interruption of signal intelligence energy in each circuit for operating the associated switch means to disconnect the circuit from its associated modulating and filtering means and to connect the output of said generator to the modulating and filtering means of the said respective circuit.

3. An automatic control system according to claim 1 wherein each of said switches comprises an electromagnetic relay having a plurality of contacts and adapted in its normal position to connect said generator to the associated modulating and filtering means, and an energizing circuit for each relay responsive to the signal intelligence energy in the associated signal intelligence circuit to energize and actuate the relay to disconnect the generator from and connect the signal intelligence circuit to its modulating and filtering means.

4. An automatic control system according to claim 1 wherein each of said switches comprises a relay having a plurality of contacts and adapted in its normal position to connect said generator to the associated modulating and filtering means, an energizing circuit for each relay responsive to signal intelligence energy in the associated signal intelligence circuit to energize and actuate the relay to disconnect the generator from and to connect the signal intelligence circuit to its modulating and filtering means, auxiliary contact means on each relay, and a busy signal circuit connected with said auxiliary contacts.

5. In a multi-channel carrier system for the transmission of signal intelligence having a plurality of signalling circuits, modulating and filtering means individual to each circuit, an output transmitting amplifier and connections between said amplifier and each modulating and filtering means, means for controlling the output level of said output amplifier comprising a signal generator, means between said signal generator and the output amplifier for controlling the signal level of said generator, individual switch means interconnected with each circuit, the associated modulating and filtering means and said signal generator, and control means for each switch operable to move the switch to one position to connect its associated circuit with the modulating and filtering means for that circuit for the transmission of signal intelligence and to move the switch to another position in response to the interruption of signal intelligence energy to connect the respective modulating and filtering means with said signal generator.

6. In a multi-channel carrier system for the transmission of signal intelligence having a plurality of signal transmitting circuits, modulating and filtering means individual to each circuit, an output transmitting amplifier and connections between said amplifier and each modulating and filtering means, means for controlling the output level of said output amplifier comprising a signal generator, means between said signal generator and the output amplifier for controlling the signal level of said generator, and connections between the geenrator and each modulating and filtering means for impressing the generator signal upon each modulator when the transmission of signal intelligence energy is discontinued in the circuit associated with that modulator.

7. An automatic control system for controlling the transmitting level of a multi-channel carrier transmission system comprising a plurality of signal intelligence circuits, modulating and filtering means for each circuit, an output amplifier connected with said modulating and filtering means, a signal generator for generating a continuous signal, means connecting said generator with the output amplifier for controlling the level of said continuous signal, individual switch means interconnected with each circuit, the associated modulating and filtering means and the signal generator, and means for operating each of said switch means in response to the interruption of signal intelligence in its associated circuit to disconnect the circuit from its respective modulating and filtering means and to connect the output of said generator to the modulating and filtering means of said respective circuit thereby impressing said continuous signal upon the respective circuit when the circuit is not used for the transmission of signal intelligence.

8. An automatic control system for controlling the transmitting level of a multi-channel carrier transmission system comprising a plurality of signal transmission circuits, modulating means for each circuit, an output amplifier common to all of said circuits, means for generating a continuous electric signal, control means between said generator and output amplifier for controlling the level of said continuous signal, and switch means for impressing said continuous signal upon each modulator during periods of interruption of signal intelligence energy in the circuit associated with that modulator.

9. In an automatic carrier transmission system for signal intelligence having a transmitting station, a receiving station and a transmission line interconnecting said stations, a plurality of signal carrying circuits, an output amplifier in said transmitting station, a plurality of modulating and filtering means individual to each circuit and connected with said amplifier, switch means individual to and connected with each modulating and filtering means, connections between each circuit and one of said switch means, a signal generator including connections between said generator and each of said switch means, and switch operating means individual to each switch and responsive to signal intelligence in the associated circuit whereby signal energy in each circuit will operate said switch in one direction to connect said circuit to its associated modulating means and interruption of said energy will operate the switch in the other direction to disconnect the circuit and connect its associated modulating means to said generator.

References Cited in the file of this patent

UNITED STATES PATENTS

| | | |
|---|---|---|
| 2,558,439 | Hurault | June 26, 1951 |
| 2,613,279 | Hurault | Oct. 7, 1952 |